Sept. 3, 1940. C. J. REPATH ET AL 2,213,719
FLOUR SIFTER
Filed May 8, 1939
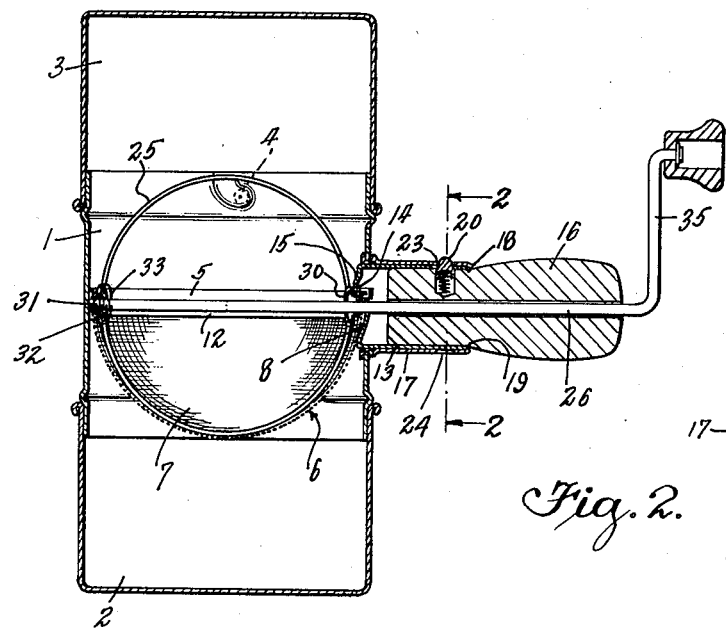
Fig. 1.
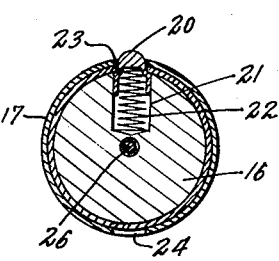
Fig. 2.
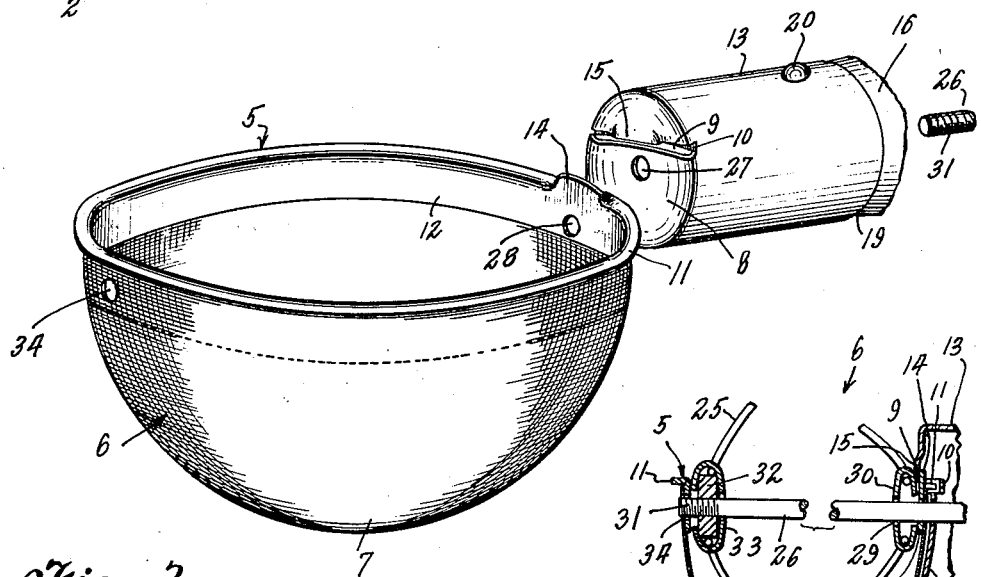
Fig. 3.
Fig. 4.
Inventors
Charles J. Repath
Beverly M. Caister
By Lyon & Lyon
Attorneys Patented Sept. 3, 1940

2,213,719

UNITED STATES PATENT OFFICE 2,213,719

FLOUR SIFTER

Charles J. Repath and Beverly M. Caister,
La Canada, Calif.

Application May 8, 1939, Serial No. 272,379

4 Claims. (Cl. 209—251)

This invention relates to a reversible flour sifter of the general construction disclosed in prior Patent No. 1,453,604, granted May 1, 1923.

The construction disclosed in this prior patent, involves the use of a reversing member rotatably mounted at the side of the flour sifter body, and to the inner end of which a sifter screen is attached, the sifter body being double-ended and provided with removable covers. In the operation of the sifter, after the flour has been sifted through the screen in one position, the reversing member can be rotated through about 180° so as to reverse the position of the screen, enabling the flour sifter to be inverted and the beater rotated so as to repass the flour through the screen.

One of the objects of the present invention is to improve the means for supporting the screen on the reversing member. The reversing member is preferably in the form of a handle rotatably mounted at the side of the sifter body, and one of the objects of our present invention is to provide improved means for enabling the socket that holds the handle, to present simple means operatable at will for holding the screen in either of its operative positions.

A further object of the invention is to improve the construction of the covers so as to enable them to operate as containers for the sifted flour.

Further objects of the invention will appear hereinafter.

The invention consists in the novel parts and combination of parts to be described hereinafter, all of which contribute to produce an efficient flour sifter.

A preferred embodiment of the invention is described in the following specification, while the broad scope of the invention is pointed out in the appended claims.

In the drawing:

Fig. 1 is a vertical section through a flour sifter embodying the invention.

Fig. 2 is a vertical cross-section taken about on the line 2—2 of Fig. 1 upon an enlarged scale, and further illustrating details of means which we may employ for yieldingly holding the sifter in either of its operating positions.

Fig. 3 is a perspective view of the sifter screen and the inner end of the reversing member, and also showing a portion of the handle broken away and the tip or inner end of a shaft that may be employed for rotating the beater that cooperates with the sifter screen.

Fig. 4 is a view corresponding to Fig. 1, but with the middle portion of the sifter shaft broken away. This view is upon an enlarged scale so as to illustrate more fully details of the connection between the sifter screen and the reversing member, and also the connection between the shaft and the sifter screen.

In practicing the invention, we provide a substantially tubular body 1 having open ends which can be closed at will by means of substantially cup-shaped covers 2 and 3. If desired, these covers may have bayonet slot connections with the ends of the body 1, such as illustrated at 4 in Figure 1. In practicing the invention, we provide a reversing member rotatably mounted in the side wall of the body 1, and this reversing member is constructed with a transverse slot which is engaged by the ring 5 of the sifter 6, which sifter has a reticulated head 7 of substantially hemispherical form. The reversing member preferably presents a disc-form head 8, which we prefer to make of metal, and which we form with a transverse slot 9. This slot may be formed in a die, and the metal is pressed back so as to form a strap 10 forming a bottom for the slot. The ring 5 is preferably of light sheet metal, and formed with a horizontal flange 11, and a vertical web 12 to which the edge of the reticulated body 7 is secured. At the point where the ring 5 is to be secured to the reversing member 13, the flange 11 is bent upwardly as indicated in Figure 3, to form an upwardly projecting tongue 14. In forming the head 8, the upper edge of the slot near its middle is offset outwardly to form a projecting lip 15, and in assembling these parts the tongue 14 is slipped up back of the lip 15 as indicated in Figure 4, and the horizontal flange 11 extends back into the slot 9 that seats against the strap 10.

While it is not essential to form the reversing member as part of the handle for the sifter, we prefer this construction, and in this case the reversing member 13 is preferably formed as a metal ferrule of relatively large diameter, which receives the inner end of a handle 16 preferably constructed of wood. The ferrule-form reversing member 13 is rigid on the handle 16, and is received rotatably in a tubular socket 17 that projects laterally from the side of the body 1. We prefer to provide simple means for retaining the handle in this socket, and for this purpose the end of the socket wall is preferably peened down slightly to form an annular bead 18 that projects into a small groove 19 formed in the wooden handle. The construction is such at this point as to enable the handle to be inserted readily when desired, but also withdrawn when it is necessary to take the sifting device apart for cleaning.

In addition to this, we prefer to provide means for holding the sifter 6 in either of its possible positions. For this purpose we prefer to provide a spring-pressed button or pin 20, which is received in a radial bore 21 formed in the handle. In the position of the screen illustrated in Figure 1, this pin 20 is located uppermost, at which time its coil spring 22 holds the nose of the pin in an opening 23 formed in the wall of the socket 17. The under side of the socket as illustrated in Figure 1, is provided with a similar opening 24 which can be engaged by the pin when the handle 16 has been rotated through 180° into its reversed position.

Any suitable means may be provided for rotating the wires that form the beater 25 of the sifter. In the present embodiment of the invention, we have employed the same means illustrated in the prior patent, but in the present instance, the operating shaft 26 for driving the beater is illustrated as located centrally in the handle 16. In assembling the parts, the shaft 26 is inserted longitudinally in the handle so that it passes freely through two aligning openings 27 and 28 in the head 2 and in the ring 5. The shaft also passes through a loose opening 29 in the hub 30 of the wire beater 25, the extreme end of the shaft being provided with threads 31 that enable it to screw into a nut 32 that is housed in the outer hub 33 of the beater. The tip of the shaft is received loosely in a centering opening 34 in the ring 5 of the screen. This enables the shaft to assist in supporting the side of the screen that is remote from the handle 16.

The shaft 26 is, of course, provided with a crank 35 for rotating the same. In this embodiment the tubular body 1 is made relatively short and the covers 2 and 3 are made relatively deep and cup-like so that they can operate as containers for the sifted flour. This enables the bottom cup or cover carrying the sifted flour to be removed without spilling any of the flour as would happen in operating the prior construction. In the present construction the sifted flour need not contact the hands of the person who sifts it.

It will be evident that after passing the flour through the screen in a downward direction with reference to Figure 1, the handle 16 can be released by pressing down on the spring-pressed pin 20 and thereafter rotated on its axis through 180° so as to enable the pin to engage the lower recess or opening 24. This movement will swing the reticulated body 7 into an elevated position, whereupon the persons using the sifter will invert it so as to bring the screen below the flour, and the shaft 26 is then rotated by means of the crank 35 to repass the flour through the screen.

Many other embodiments of this invention may be resorted to without departing from the spirit of the invention.

What we claim is:

1. In a reversible flour sifter, the combination of a tubular body, a reversing member mounted on the body for rotation on an axis extending laterally from the body, the inner end of said reversing member having a slot, a sifter screen of substantially hemispherical form having a reticulated body with a marginal ring received in said slot, the member and marginal ring having correlated means enabling the ring and the reversing member to form an inter-locking connection with each other and operating to support the screen, and a beater rotatably mounted within the tubular body and cooperating with the screen to sift the flour, with means for rotating the same.

2. In a reversible flour sifter, the combination of a tubular body, a reversing handle mounted for rotation on said body on an axis extending laterally from the same, said handle having a disc-form head adjacent the side wall of the body and having a slot therein, a sifter screen of substantially hemispherical form capable of assuming two opposite positions, and having a reticulated body with a marginal ring having a flange received in said slot, said ring having an extension engaging under the slot to retain the ring on the handle, and a beater rotatably mounted within the tubular body and cooperating with the screen to sift the flour, said handle operating when rotated on its axis to move the screen into a reversed position to enable the flour to be repassed through the screen.

3. In a reversible flour sifter, the combination of a tubular body, a reversing member mounted on the body for rotation on an axis extending laterally from the body, the inner end of said reversing member having a slot, a sifter screen of substantially hemispherical form having a reticulated body with a marginal ring received in said slot, said slot and ring having correlated means enabling the ring and the reversing member to form an interlocking connection with each other and operating to support the screen, a beater rotatably mounted within the tubular body and cooperating with the screen to sift the flour, with means for rotating the same, said reversing member operating when rotated on its axis to move the screen into a reversed position to enable the flour to be repassed through the screen, and means for holding the screen in either of its positions.

4. In a reversible sifter, the combination of a tubular body, a reversing member mounted on said body for rotation on a longitudinal axis extending laterally from the body, said reversing member having a disc-form head adjacent the side wall of the body and having a slot therein, a sifter screen of substantially hemispherical form having a reticulated body with a marginal ring, said ring having an outwardly projecting flange received in said slot and interlocking with the same to support the ring on the head, a beater rotatably mounted within the tubular body and cooperating with the screen to sift the flour, and means for rotating the same, said reversing member operating when rotated on its axis to hold the screen in a reversed position to enable the flour to be repassed through the screen; and yielding means for holding the reversing member in either of its positions.

CHARLES J. REPATH.
BEVERLY M. CAISTER.